Patented Aug. 30, 1949

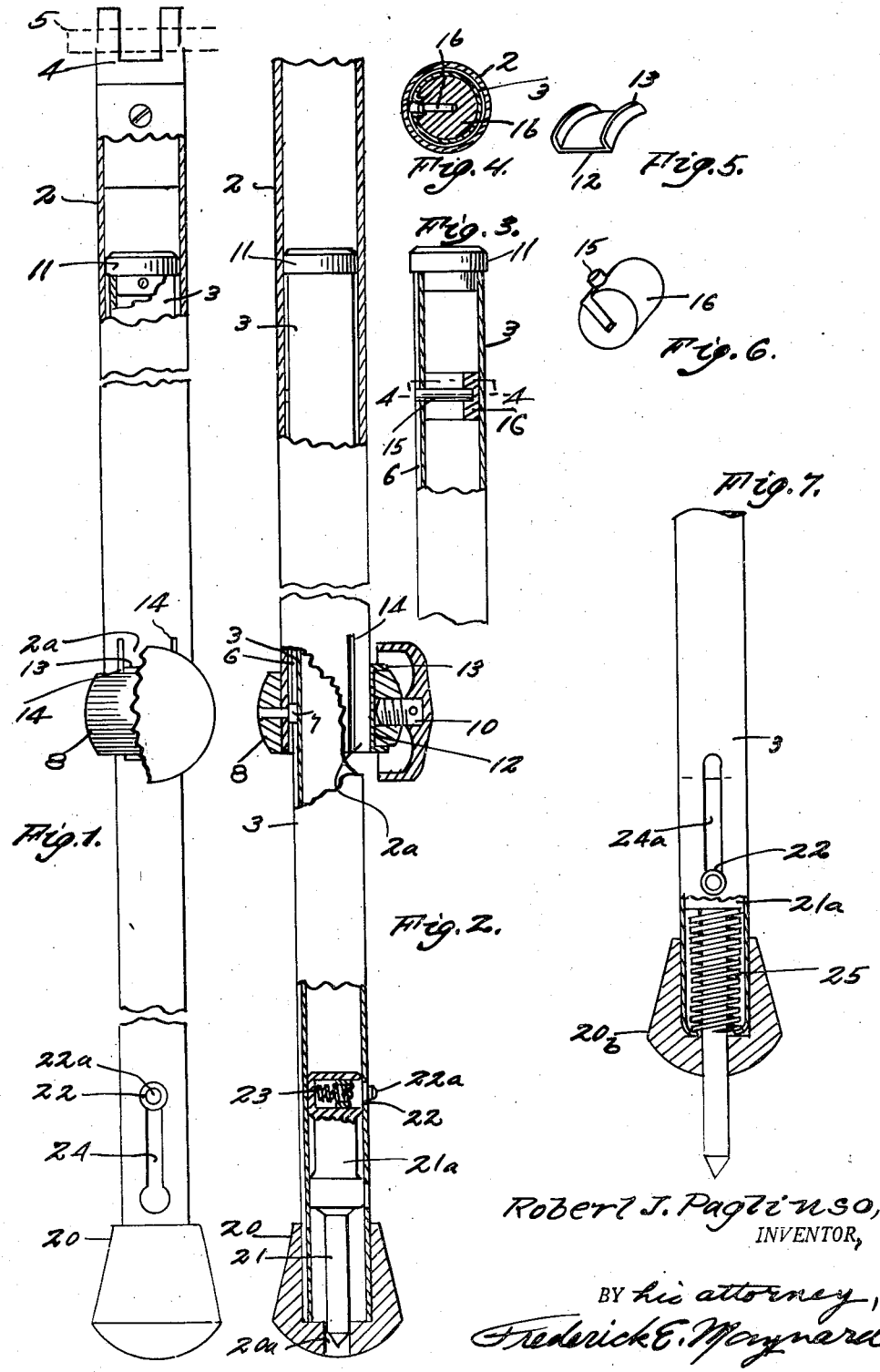

2,480,382

UNITED STATES PATENT OFFICE 2,480,382

TRIPOD LEG STRUCTURE

Robert J. Pagliuso, Glendale, Calif.

Application April 22, 1946, Serial No. 663,979

6 Claims. (Cl. 248—191)

This invention is a tripod leg structure of a type for use with cameras; though its use is not thus limited.

It is one object of the invention to greatly improve the construction of tripod legs involving tubular, telescopic legs sections, whereby to secure the relative adjustment of the sections with rapidity and facility, and to effect rigidity of the sections after the desired adjustment has been made.

Another object of the invention is to provide telescopic legs sections which cannot be rotated relatively out of a given position in which they are assembled for telescopic actions only.

A further purpose of the invention is to provide a sectional leg structure, in a tripod, in which substantially cylindrical leg sections are employed and are so constructed and assembled that sliding contact or bearing features are of such character as to prevent long surfaces of contact being made as between the mutually telescopic sections—to effect a smooth sliding action and prevent galling of contiguous surfaces of the sections.

An additional object is to provide a tripod structure involving telescopic sections having an intersplined relation to prevent relative rotation of the sections and to provide a splining device incorporating mutually abutting parts to limit the extension of the related leg sections.

Also, an object of the invention is to provide a simple, reliable, effective and substantial clamp or locking device whereby to temporarily fix the leg sections at desired positions of longitudinal adjustment anywhere in their range of shift; and in this connection an object is to secure long life of the braking device by provision of co-acting portions of ample bearing surface.

It is a highly desirable object to have a tripod leg having such a foot end structure that the leg can be reliably positioned by way of a rubber or rubber like toe without hazard of slipping on the engaged surface, and to include in the foot of the tripod leg a readily available hard and pointed spike to effectively take a standing hold in cases when the rubber toe might not be so sure in action, and further, an object is to provide a readily projective, normally retracted and concealed spike device, and moreover, to provide a self-locking and automatic spike device.

The invention resides in certain features of advancement in the construction of tripod legs as set forth in the ensuing disclosure and having, with the above, additional objects and advantages as hereinafter developed, and whose constructions, combinations and sub-combinations, and details of means and the manner of operation and functions, will be made manifest in the following description of the herewith illustrative embodiments; it being understood that modifications, variations and adaptations may be resorted to the scope, spirit, and principles of the invention as it is more directly claimed in conclusion.

Figure 1 is a longitudinally broken, partly sectional side elevation of the partly contracted leg. Figure 2 is a sectional elevation of relatively extended sections of the leg (in a view 90° as to Fig. 1). Figure 3 is a detail section of the upper end of the lower, inner section of the leg and showing its stop pin. Figure 4 is a cross-section of the leg section, on line 4—4, Fig. 3. Figure 5 is a perspective of the brake presser plate. Figure 6 is a perspective of the stop pin and its mounting block. Figure 7 is a sectional elevation showing the self-retracting embodiment of the ground spike.

The leg here shown embodies an elongate, cylindrical, upper section 2, and an elongate, generally cylindrical, inner, lower section 3 of less size than the bore of the section 2 so as to be generally free from contact therewith to avoid long frictionally engaging surfaces and prevent mutual chafing of the contiguous surfaces of these sections, and thereby obtain a smooth sliding action and long life of these parts. The upper end of the section 2 is provided with a suitable yoke 4 whereby to attach by way of a pivot 5 to a given tripod head or table (not shown).

For the purpose of preventing relative rotation of the leg sections 2 and 3 means are provided to effect a splined, guided telescopic action of the sections, one in the other. For the practical accomplishment of this splining feature the inner section 3 has an external, elongate splineway or channel 6 into which there constantly projects a rigid, substantial spline key 7 securely mounted in a substantial collar 8 rigidly affixed on the lower end of the section 2.

The collar 8 not only carries the fixed key 7 but also forms a support for a brake or clamp means by which the lower leg section may be securely locked at any position of longitudinal adjustment in the outer section 2. This locking means includes a hand screw 10 snugly threaded in the collar at a side thereof which is opposite to the location of the spline key 7, so that by turning the screw in the inner leg section 3 will be jammed over onto the face of the bore of the section 2 immediately at the lower end of the section 2; whereat will be the only sliding contact zone of the inner section 3 on the outer section. This is made so because the upper end of the inner tube 3 is provided with a centering head 11 of slightly larger diameter than the section 3 and snugly fitting the bore of the section 2.

To secure rigidity and long life of the brake device, and to give a smooth sliding action of the released leg sections, the screw 10 has direct engagement with an arcuate presser plate 12, Fig. 5, fitted movably in the collar 8 and held thereon against end play by plate flanges 13. The plate fits on and inwardly depresses a resilient leaf portion 2a formed in the end portion of the section 2 by cutting longitudinal, parallel slots 14 therein. It will be seen that regardless of the longitudinal position of adjustment of the lower leg section 3 in the outer section 2, the locking leaf 2a can be pressed in by the presser plate 12, as the hand screw 10 is turned inward, to engage and force the interposed leg section over to and firmly against the near bore face of the lower end of the upper section 2.

The spline key 7 has the additional function of acting as a positive barrier in the path of a cooperative device carried by the lower section 3 whereby to stop extension of this section from the housing or outer section 2. The device here mentioned embodies a substantial radial pin 15 firmly driven into and expanding a mounting block 16 solidly in the bore of the relative inner, lower section 3, Fig. 3; the block being near the upper end of this section. At any position of the extensible leg section 3 its head 11 forms a reliable stabilizer for the said section, and when the brake or clamp designed to close on the inner section is well set by the screw 10 the leg assembly is made reliably rigid and capable of standing rough handling—which is incidental to photo-tripod use. When the locking or clamp device is free the leg sections can be easily, smoothly, quickly and accurately adjusted to the desired relative position, and in a fraction of a second the clamp device can be set up to rigidly hold the adjusted, splined sections 2 and 3.

A particular advance in tripod legs here incorporates a combination of parts on the foot end of a leg selective for the reliable holding of the leg foot on various natures of ground or other surfaces upon which it is desired to stand the tripod.

For use on some surfaces there is suitably fixed on the bottom end of the leg section 3 a hard rubber or other non-scratching toe 20 enclosing the section end. Frequently it is necessary to set up a tripod on surfaces where the rubber toe cannot rest with reliable security either due to the nature of the surface or an unfavorable angle of repose. To accomplish safety of leg footing there is here provided a hard metal spike 21, which, in Figs. 2 and 7 is axially slidable in and as to the fixed toe 20 in the bore hole 20a of which the spike 21 is guided and stabilized.

The inner end of the spike has a rigid plunger 21a guidedly fitting the bore of the leg section 3 and movable downwardly to project the spike from a concealed and protected position, Fig. 2, to an exposed and useful position, Fig. 7. The inner end of the plunger 21a is provided with a radial button 22 constantly pressed outwardly by an expansion spring 23 in the plunger. Along the foot end of the leg section 3 is made a dumbbell slot 24, Fig. 1, in which the button 22 interlocks when the spike is either retracted or projected and the outer end of the button has a reduced nog 22a sliding in the reduced portion of the slot 24 when the button is depressed to unlock it from the bulb end of the slot. The spike 21, of Fig. 2, is shifted in or out by manual effort on the button 22, and self-locks, when released from control, in the bulb ends of the button slot 24.

If desired the spike 21 may be of self-retracting type as in Fig. 7, where an expansion spring 25 seated in the leg end, reacts on the plunger 21a so that when the extended spike is unlocked by depression of its locking button 22, at the outer position, Fig. 7, the spring 25 instantly snaps the spike back into the guide slot 24a which has no enlargement at its upper end since the spring 25 holds the spike retracted.

What is claimed is:

1. A tripod leg composed of telescopic, tubular sections one of the sections having a resilient leaf part, and a manually operative device for clamping the leaf in holding function on the other section and including a collar fixed on the outer section, a flanged clamp plate movably fitted in the collar and resting on said part, and a set screw in the collar for pressing the plate in clamping action on said part; and a key rigidly fixing the collar to the outer section and splining the inner section to the outer section; said sections mutually bearing one in the other.

2. A tripod leg having telescopic mutually interbearing sections one of which has a splining key holding the sections against relative rotation and which forms a stop cooperative and to limit extension of the other section, and a collar fixed on the outer section by said key and having a presser plate fitted on the inner section and a clamp screw in the collar for closing the said plate; the outer section lining the bore of the collar.

3. A tripod leg including telescopic, tubular sections; a collar on the lower end of the outer section, a key in and fixing the collar and splining and limiting extension of the inner section, and a resilient leaf member affixed to the outer section, a hand screw mounted in the collar, and a presser plate in the collar and depressible by the screw to contract the leaf into holding engagement on the inner section.

4. A tripod leg having telescopic sections nonrotative one on the other and the inner section having a splineway, a block in the bore of the inner section and a diametrical stop pin projecting from the block into the splineway, and the outer section having a spline key slidable in the said splineway, and a clamp collar fixed to the outer section by said key; said key and said pin being cooperative to stop extension of the said sections relatively.

5. A tripod leg section having a traction foot part and a spike axially shiftable in the said part, said part having a longitudinal slot in one side with button seats at its ends, and a radial-shank button yieldably mounted in said spike and shiftable along the slot with axial motion of the spike and interlocking in either of the said seats to fasten the spike in selected position.

6. The combination of claim 5; the spike shifting unresistingly when the button is cleared from the said seats.

ROBERT J. PAGLIUSO.

REFERENCES CITED

The following references are of record in the file of this patent:

UNITED STATES PATENTS

| Number | Name | Date |
|---|---|---|
| 47,265 | Allamby et al. | Apr. 18, 1865 |
| 347,927 | Esser | Aug. 24, 1886 |
| 608,850 | Folmer | Aug. 9, 1898 |
| 1,394,596 | Wohl et al. | Oct. 25, 1921 |
| 1,774,264 | Goodrich | Aug. 26, 1930 |
| 1,782,660 | Meyer | Nov. 25, 1930 |
| 2,044,187 | Schwarz | June 16, 1936 |
| 2,298,380 | Hood | Oct. 13, 1942 |
| 2,302,237 | McFall | Nov. 17, 1942 |
| 2,337,719 | Hueglin | Dec. 28, 1943 |